United States Patent
Sorensen et al.

(10) Patent No.: US 12,138,870 B2
(45) Date of Patent: Nov. 12, 2024

(54) METHOD FOR PRODUCING A REINFORCEMENT ROD FROM A FIBROUS COMPOSITE MATERIAL USING ULTRAVIOLET RADIATION

(71) Applicant: Strongwell Corporation, Bristol, VA (US)

(72) Inventors: Joe Sorensen, Mazeppa, MN (US); Josh Maggert, Winona, MN (US)

(73) Assignee: Strongwell Corporation, Bristol, VA (US)

( * ) Notice: Subject to any disclaimer, the term of this patent is extended or adjusted under 35 U.S.C. 154(b) by 0 days.

(21) Appl. No.: 18/107,952

(22) Filed: Feb. 9, 2023

(65) Prior Publication Data
US 2023/0191726 A1    Jun. 22, 2023

Related U.S. Application Data

(63) Continuation of application No. 17/498,035, filed on Oct. 11, 2021, now abandoned.

(51) Int. Cl.
*B29C 70/52* (2006.01)
*B29L 31/06* (2006.01)

(52) U.S. Cl.
CPC ......... *B29C 70/521* (2013.01); *B29L 2031/06* (2013.01)

(58) Field of Classification Search
CPC ...... B29C 70/52; B29C 70/521; B29C 70/523
See application file for complete search history.

(56) References Cited

U.S. PATENT DOCUMENTS

| 4,861,621 A | 8/1989 | Kanzaki | |
| 5,182,064 A * | 1/1993 | Ishizuka | E04C 5/07 264/137 |

(Continued)

FOREIGN PATENT DOCUMENTS

| CN | 104760304 B | 12/2017 |
| EP | 0290849 A2 | 11/1988 |

(Continued)

OTHER PUBLICATIONS

Aronix, UV-curable Resin_Toagosei Co., Ltd_accepted Apr. 2023 (Year: 2023).*

(Continued)

*Primary Examiner* — Yunju Kim
(74) *Attorney, Agent, or Firm* — Woods Rogers Vandeventer Black PLC; Nathan A. Evans

(57) ABSTRACT

A method for producing a reinforcement rod from a fibrous composite material comprising continuous mineral fibers and at least one resin, the resin being mixed with the dry mineral fibers, then wrapped with a strand of material, and the resin then being instantaneous or nearly instantaneously fully cured (e.g., snap cured) to form an optionally round rod with an optionally helical rib. In aspects, a mixture comprising an environmentally friendly and zero or low volatile organic compound (VOC) emitting resin and a resin-curing agent mixture is used. In aspects, helical ribs are added to the surface of the rod in a manner not to disrupt the longitudinal orientation of the core reinforcing mineral fibers. In aspects, ultraviolet irradiators are used to snap cure the reinforcement. When fully cured, corrosion resistant mineral fibers are encapsulated in a corrosion resistant matrix. The process allows for a simplified, condensed, and single operation for producing a corrosion resistant fibrous composite reinforcement rod.

7 Claims, 7 Drawing Sheets

(56) References Cited

U.S. PATENT DOCUMENTS

| | | | | |
|---|---|---|---|---|
| 5,700,417 | A * | 12/1997 | Fernyhough | ............ C08J 5/043 |
| | | | | 522/135 |
| 9,133,283 | B2 * | 9/2015 | Yang | ......................... B32B 5/28 |
| 10,343,311 | B2 | 7/2019 | Schinkinger | |
| 2019/0217557 | A1 | 7/2019 | Lewit et al. | |

FOREIGN PATENT DOCUMENTS

| | | |
|---|---|---|
| KR | 100861578 B1 | 10/2008 |
| KR | 101354534 B1 | 1/2014 |

OTHER PUBLICATIONS

Bonardi et al., "Thermal Initiators as Additives for Photopolymerization of Methacrylates upon Blue Light", Coatings 2020, 10(5), 478) (Year: 2020).*

* cited by examiner

METHOD FOR PRODUCING A REINFORCEMENT ROD FROM A FIBROUS COMPOSITE MATERIAL USING ULTRAVIOLET RADIATION

CROSS-REFERENCE TO RELATED APPLICATION

The present application relies on the disclosures of and claims priority to and the benefit of the filing date of the following U.S. patent application:

U.S. patent application Ser. No. 17/498,035, filed Oct. 11, 2021.

The disclosures of that application are hereby incorporated by reference herein in their entireties.

BACKGROUND

Field of the Invention

The present invention is directed to a method for producing a reinforcement rod from a fibrous composite material consisting of continuous mineral fibers and a resin via a pultrusion process. In aspects, the resin used is an environmentally friendly mixture emitting zero or low volatile organic compounds, containing at least one curing agent, wherein at least one of the curing agents forms a reactive species when exposed to ultraviolet radiation (e.g., photoinitiators). In aspects, the mineral fiber and resin mixture are wound with a fiber strand in a manner that does not disturb or only minimally disturbs the longitudinal orientation of the mineral fibers. The mineral fibers, resin, and fiber strand are then exposed to ultraviolet radiation and the resin is fully cured instantaneously or nearly instantaneously in what is referred to as a "snap cure."

Description of the Related Art

The pultrusion process is known in the art, and a distinction is typically made between a method of curing within a die and curing outside a die. Further, a process of manufacturing fibrous composite reinforcement rod is known from prior art. In the known art, infrared ovens can be used to initiate a cure of the fibrous composite rods. However, in the industry of reinforcement rods a need exists for an environmentally friendly, more streamlined process to more efficiently and rapidly create strong, light, corrosion resistant, and affordable reinforcement rods.

U.S. Pat. No. 10,343,311 entitled "Method for Producing a Reinforcement Rod" teaches, e.g., using a fibrous composite material consisting of continuous mineral fibers, a resin, and resin-curing agent mixture. However, the reference uses basalt, as opposed to the present reinforcement rod invention preferring the use of corrosion resistant glass reinforcement fibers. Also, the reference teaches a peripheral laminate, while the rod according to the present invention comprises, in aspects, a singular core group of unidirectional reinforcement fibers arranged in a manner that the fibers are distributed evenly throughout the resin matrix, which allows, in embodiments of the current invention, every fiber or most fibers to contribute to the mechanical properties of the rod in the desired longitudinal direction. The reference teaches using a vinyl ester, styrene based resin, whereas the preferred resin according to the current invention is a one-part epoxy resin. The reference teaches a blend of peroxides, initiated by heat, whereas the current invention prefers a curing agent comprising a photoinitiator or a blend of photoinitiators that are initiated by ultraviolet radiation.

The current invention provides improvements and advantages over the prior art, including but not limited to, that the method according to the present invention prefers one single step, a near instant "snap cure." U.S. Pat. No. 10,343,311 teaches using two separate curing steps. This current process according to the present invention has advantages and improvements over the prior art with respect to, among other things, a smaller process footprint, higher line speeds, a single curing step, and uniform fiber and resin distribution. The prior art, for example, utilizes infrared ovens that may span 10 to 50 feet in length, whereas the ultraviolet irradiators used to achieve full cure at high speed in the current process according to the present invention, in aspects, only span 5 inches to 10 feet in length. Another advantage of the current invention is the use of, in aspects, a zero emission resin mixture, providing an environmentally friendly process. For example, in aspects, resin baths according to the current invention do not need to be enclosed and exhaust systems to remove VOCs from the plant are not needed. Further, the current process prefers a single winding step, whereas the prior art, such as U.S. Pat. No. 10,343,311, uses 2 or 3 strands wound onto a rod. The current process ensures uniform distribution of the fibers within the resin matrix throughout the cross-section of the rod; accordingly, in aspects, the cross-section of the rod according to the present invention will not contain bundles of fiber rich areas and/or resin rich areas such as in U.S. Pat. No. 10,343,311, which shows a non-uniform distribution of fibers and resin. Additionally, the current process provides for relatively easy start and stop in an instant or near instant without concerns of resin curing or tooling becoming immobilized by partially or fully cured resin. This provides for ease of operation for the operator and maintenance personnel as compared to the prior art.

SUMMARY

An object of the present invention is to provide a novel and improved method for manufacturing a fibrous composite reinforcement rod via ultraviolet radiation.

In aspects, the fibers are first pulled from a rack by a pulling device through a grid. The grid may ensure the organization of the fibers and may reduce the risk of entanglement with one another. The rovings may then be pulled through a wet-out device where the fibers are impregnated with resin. An object of the present invention is, in aspects, the utilization of zero or low emissions resin mixtures. The resin mixtures allow for the use of an open wet-out bath and an environmentally friendly process. After impregnation, fibers are pulled through a preforming device to remove excess resin and form the fibers into a group of the desired size and shape. In embodiments, another object of the present invention is having a preforming design that provides for a high fiber volume and a uniform resin distribution throughout the cross-section of the rod. In other words, the present invention, in aspects, comprises a uniform distribution of fibers in resin, which do not form dense bundles of fibers in the resin. Thus, according to aspects of the current invention, the rod has a uniform distribution of fibers in resin, such that there is a uniform distribution of fibers in the resin through a cross-section of the rod. Following the preforming device, the rovings are then wound with a fiber strand by a winding device. An object of the present invention is the creation of a single helical rib by the winding device in a single streamlined step. Afterwards, the rod may then pass through a resin coating device wherein the rod may receive a coat of resin about its entire surface. Next, the rod may pass through a sand coating device wherein a layer of sand grit may adhere to the entire surface of the rod. Then, in aspects, the composite is fully cured in an out of die fashion by ultraviolet irradiation. In an object of the present invention, the utilization of ultraviolet irradiators and photoinitiators within the resin mixture prompt a snap cure of the resin within and on the surface of the rod. In aspects, the snap cure is immediate or nearly immediate. In aspects, the snap cure creates a rod that is fully cured and is the final product.

In embodiments, another object of the present invention is having a preforming design that provides for a high fiber mass content and a uniform resin distribution throughout the cross-section of the rod. In aspects, the rod comprises a fiber mass content of equal to or above 70%. In a preferred embodiment, the rod has a fiber mass content of equal to or above 80%. In aspects, the rod could have a fiber mass content equal to or above 90%.

BRIEF DESCRIPTION OF THE DRAWINGS

The accompanying drawings illustrate certain aspects of some of the embodiments of the present invention and should not be used to limit or define the invention. Together with the written description the drawings serve to explain certain principles of the invention.

DETAILED DESCRIPTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In embodiments, advantages of the inventive method described herein are provided by, among other things, using photoinitiators in the resin mix in combination with high-intensity ultraviolet irradiators, which allow the rod to be fully cured in a single step nearly instantaneously. According to the current invention, fully cured means to cure the thermosetting resin within a fibrous composite to a degree of 95% cure or greater. This definition is supported by ASTM standard D7957/D7957M-17 *Standard Specification for Solid Round Glass Fiber Reinforced Polymer Bars for Concrete Reinforcement*, by way of example, and the current Application hereby incorporates by reference past, current, and future iterations of the ASTM standard D7957/D7957M-17 *Standard Specification for Solid Round Glass Fiber Reinforced Polymer Bars for Concrete Reinforcement* herein.

This snap cure allows for high production line speeds and small production line footprints. In addition, in embodiments, a zero-emissions resin system allows for an environmentally friendly manufacturing process. Also, the process of adding a rib to the surface of the rod without disturbing or only minimally disturbing the linear orientation of the core fibers allows for the entirety (or near entirety) of the core fibers' tensile strength to be used in the desired direction, thus creating relatively high tensile properties of the rod. In aspects, by way of example only, the Ultimate Tensile Strength of the rod can be 1,200 MPa (Megapascals) or greater, 1,300 MPa or greater, 1,400 MPa or greater, 1,500 MPa or greater, and so on. In aspects, by way of example only, the Tensile Modulus of the rod can be 60 GPa (Gigapascal) or greater, 61 GPa or greater, 62 GPa or greater, 63 GPa or greater, 64 GPa or greater, 65 GPa or greater, 66 GPa or greater, 67 GPa or greater, 68 GPa or greater, 69 GPa or greater, 70 GPa or greater, 71 GPa or greater, and so on.

Figure 6:
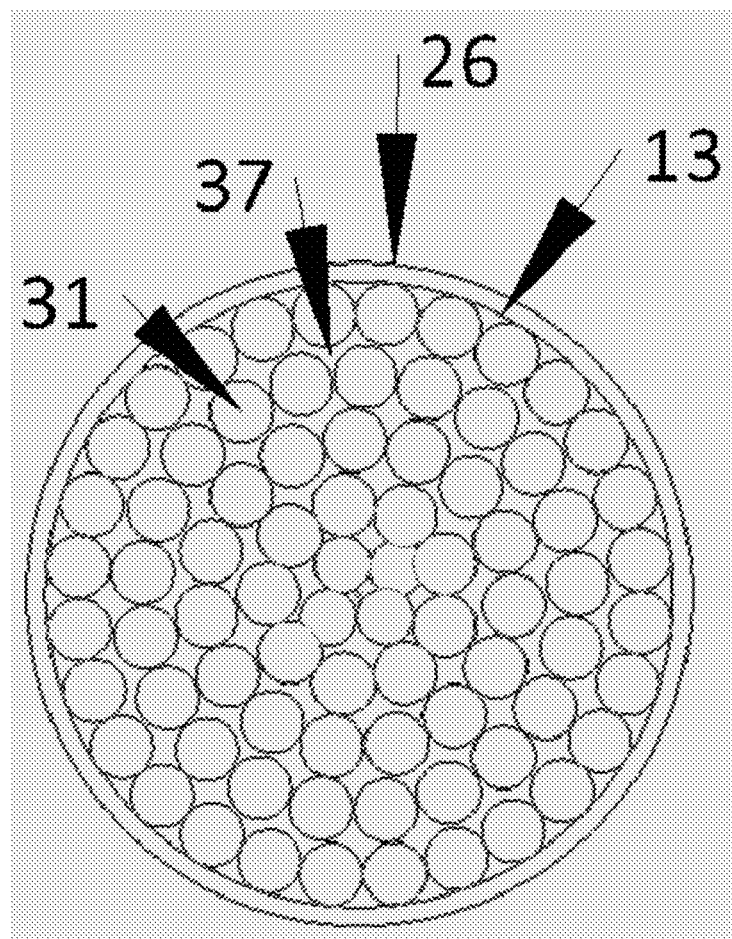
FIG. 6 is a schematic of a possible product resulting from the embodiment of the invention described herein.

Finally, this method, in aspects, produces a rod with an equal (or nearly or about or substantially equal) distribution of fibers and resin throughout the cross-section of the rod. This equal distribution of fibers and resin reduces thermal energy build ups within the rod, reduces internal stresses, reduces voids, reduces cracking, and optimizes the mechanical properties of the composite rod, by way of example. In aspects, a uniform distribution of fibers and resin throughout the cross-section of the rod means that the fibers are equally, nearly equally, or substantially equally, distributed throughout the resin in the cross-section of the rod. In other words, in aspects, there are no areas of the rod that have a higher concentration of fibers than in another area of the rod, and there are no areas in the rod that have a higher concentration of resin than in other areas of the rod, including in a cross-section of the rod. This is shown in FIG. 6, although the fibers 31 in the figure are not to scale.

The curing agents are preferably selected from the group of radical formers, such as for example peroxides, azo compounds, photoinitiators, and mixtures thereof. In a preferred embodiment, a photoinitiator is used and may be a blend of different photoinitiator types. A photoinitiator or photoinitiator blend may be used as a stand-alone initiator or may be used in conjunction with other types of forming initiators, including radical forming initiators.

In a preferred embodiment, the reaction is started when the photoinitiators are exposed to ultraviolet radiation and consequently form reactive species. When photoinitiators are used exclusively, in aspects, all reactive species will be formed from ultraviolet radiation exposure.

In the case of using photoinitiators in conjunction with thermally activated initiators, the photoinitiators, in aspects, can serve a function of kick-starting the reaction. The reaction that ensues is exothermic, thus increasing the temperature of the resin. The increase in temperature activates the thermally reactive initiators and further drives both the polymerization and cross-linking of the resin. The use of ultraviolet and thermally activated initiators in tandem is known as "dual-curing." Dual-curing is especially effective when used to cure resin that is difficult for ultraviolet light to reach, such as the center-most resin in thick composite parts or areas that are blocked from direct light exposure.

Examples

Examples of various embodiments of the invention are presented below.

Fiber rack possible embodiments—In one aspect, a fiber rack is provided with varying dimensions and fiber package (units of packaged fibers) capacity. The dimensions may vary as a function of what is necessary to accommodate the required number of fiber packages as would be understood by one of ordinary skill in the art. The package capacity may range from, but is not limited, to 10-2000 packages, such as from 10 to 20 packages, 20 to 30 packages, and so on. The fiber packages may utilize a center-pulling roving or an outer pulling roving. The fiber package may contain a single end roving to pull from the package or multiple roving ends to pull from the package. A roving is a group of fibers. The fibers may be guided from their respective package to their destination by various guiding methods such as tubes, holes, or other methods. The guiding material may be metallic, wood, or plastic, so long as it has smooth surfaces for the fiber rovings to travel along. Any number of fiber rovings may be guided through a single tube, hole, etc.

Fiber rack preferred embodiments—In embodiments, the fiber rack may be at least 2 feet wide, 2 feet tall, and 10 feet long. The fiber rack may have the capacity to house at least 10 fiber packages. The fiber package may be a single end and center pulling package. The fiber rovings may be fed through a tube or a series of grids. Tubes or grids may be used to guide the mineral fiber from its location on the rack to the downstream end of the rack. Two rovings from two packages may be fed through each tube or grid. The guide tube or grid hole inside diameters may be, but are not limited to, about 0.25 inch to about 1.00 inch. The material may be metallic, polymer, ceramic, or wood, by way of example.

Grid possible embodiments—In aspects, the rovings pass through holes in a grid, and, to ensure rovings pull along the desired path and do not entangle with each other, the grid may provide a smooth transition from a glass rack to a wet-out device. In aspects, a grid may comprise a sheet material with holes in it that are organized into a pattern. The pattern may be any shape, for example linear rows and columns or a circular pattern. The holes may have a radius on the entry and exit side of holes, of which the radius may be the same or different on each side. In aspects, the holes may be smooth (to the touch) to reduce friction and abrasion on the rovings. In aspects, the hole diameters may range in size, by way of example, from 0.125 inch to 1.0 inch, but may be above 0.05 inch, 0.10 inch, 1.0 inch, 2.0 inches, and so on. In aspects, any number of rovings may pass through a single hole, preferably from 1 to 200, although the number may be over 200, such as from 200 to 250, 250 to 300, 300 to 350, 350 to 400, and so on. In aspects, dimensions of length and height of the grid are preferably from 1 inch to 10 feet, but may be over 10 feet such as 11 feet, 12 feet, 13 feet, 14 feet, 15 feet, and so on. Further, in aspects, the thickness dimension of the grid may be anywhere from 0.125 inch to 1 foot, but may be over 1 foot, such as between 1 foot and 2 feet, 2 feet and 3 feet, 3 feet and 4 feet, 4 feet and 5 feet, and so on. The grid may be placed any distance from adjacent devices. In aspects, the grid material may be plastic, metallic, ceramic, wood, or other material(s) capable of producing a smooth surface.

Grid preferred embodiments—In a preferred embodiment, the grid is at least 2 feet wide, at least 2 feet tall, and at least 0.25 inch thick. The grid holes may be organized in linear rows and columns. The holes may have a radius on both entry and exit, which may be the same or different. The entry radius, inside diameter, and the exit radius may all be smooth surfaces. The hole diameters may be at least 0.25 inch but less than 1.00 inch. A number of rovings ranging from 1-100 may be pulled through each hole. The grid may be positioned 1 to 10 feet away from the fiber rack and 1 to 10 feet away from the wet-out device. High density polyethylene may be used for its low friction characteristics to reduce friction to fiber rovings passing through the grid holes.

Wet-Out Device

Possible embodiments—The wet-out device may be used to impregnate dry roving fibers with resin. In aspects, the rovings are pulled through a series of tools that disrupt the fibers' longitudinal path and force the roving fibers to spread apart and fan-out. The tools may be bars, tubes, formed sheets, or various other profiles. In aspects, tools may be aligned in a direction that is perpendicular to the direction of travel of the rovings. Any number of tools, preferably from 1-100, may be used, although more bars may be used, such as from 100-200, 200-300, 300-400, 400-500, and so on. In aspects, the tool surface that contacts the rovings may be smooth and have a radius, which can decrease friction and abrasion of rovings. The degree to which the roving fibers separate from each other and fan-out can be determined by the number of breaks from the roving's linear path, the break angle or change in direction of the roving, and the tension in the roving. Any number of breaks may be used, ranging from 1-100, for example. Any change in angle may be used from, for example, 1° to 179°. The number of breaks and the angles may be chosen to best suit the given process. This method prefers at least 3 breaks and at least a 5° break angle. The rovings may be fanned-out in a vertical direction, a horizontal direction, a diagonal direction, or any direction in-between in order to best suit the process. The fiber rovings may be fanned-out before, during, after, or any combination thereof, passing through an open resin bath. The bath may be a container of any shape that can hold liquid resin. Liquid resin may be pumped into the container from a larger container that is holding bulk amounts of liquid resin. As the resin container is filled and as the fiber rovings are pulled through it, the resin may overflow or drain from the bath. A separate drip container may be used below the bath to catch dripped or drained resin. A pump may be used to cycle the resin from the drip container back into use in the resin bath. The large containers in tandem with the pump allow for a larger volume of resin to be in use at a time, reducing the frequency at which the resin bath needs to be filled. A resin injection box may be used in place of an open resin bath. In cases, an advantage of an injection box is a reduction in emissions produced from the resin as well as, in aspects, a more clean process. An injection box is a nearly enclosed box that the rovings pass through and resin is injected into the box through a single port or multiple ports. The box may be made from any structurally sound and chemical resistant material, for example, metal, polymer, or ceramic. The fiber rovings encounter tooling within the box that fan-out the rovings and allow fiber impregnation. The resin is contained within the box and only resin carried out at the downstream exit of the box by the rovings is allowed to exit the box.

Wet-out embodiment—The present invention, in a preferred embodiment, uses an open bath as a main component of the wet-out device. In the past, an open bath allowed hazardous VOC emissions to contaminate the air. The advantage of the present invention, among other things, is that the current method, in aspects, utilizes zero-emission or near-zero emission resin mixtures. This can allow for an open bath to be used while not releasing hazardous emissions into the air. An open bath is a relatively low-cost and relatively simple device that is easily replenished with resin and allows for optimal line speeds. The preferred wet-out device comprises round smooth bars that are oriented perpendicular to the direction of movement of the fiber rovings and a wet-out bath. The rovings may contact a round smooth bar prior to entering the bath. The rovings may then be guided into the resin bath, guided through the length of the bath, and guided out of the bath by additional smooth round bars. The smooth round bars may be any diameter ranging from 0.125 inch to 1.00 inch in diameter, by way of example only. It should be noted that the bars may also be different shapes or may be hollow tubes. The bar material may be metal, polymer, or ceramic, in aspects. The width of the resin bath may range from 6 inches to 36 inches, by way of example. The depth of the resin bath may range from 1 inch to 24 inches, by way of example. The resin may be fed into the bath through a tube or hose that is connected to a larger container in or near the wet-out device. The resin may be pumped from the large container to fill the bath. The pump may be operated manually or automatically by an electronic control system. The bath may be required to be at a constant fill level during production so that all rovings are fully submerged in resin at all times. Resin may overflow or drip from the bath and be captured by a container. This container may be the same container that holds the resin that is pumped into the resin bath, thus cycling dripped resin back into the bath for further use. In embodiments, it is preferred that the rovings are fanned-out to a high or sufficient enough degree that the rovings achieve a high or sufficient degree of resin impregnation. This may be achieved by providing ample space for the rovings to fan-out across the round smooth bars. Another factor to consider is the time spent submerged within the resin. Rovings should, in aspects, be submerged for at least 3 seconds to obtain full or sufficient resin impregnation. In aspects, to ensure ample submersion time the resin bath length should correlate with line speed. Higher line speeds, in aspects, would require a longer resin bath. The wet-out device components may be made from any chemically resistant material suitable to hold a liquid; examples include metal, polymer, and ceramic.

Preforming device possible embodiments—With regards to a preforming device, it may, in aspects, provide two functions. The first function may be resin stripping to obtain a desired fiber-to-resin ratio. The second function may be shape formation, wherein rovings are gradually confined into a group(s) to resemble the shape and size of the final product. Resin stripping is generally accomplished via two mechanisms, wiping and compressing. Wiping occurs when rovings that are carrying resin proceed to slide across a tool surface and a portion of the resin is removed from the rovings. Wiping may occur in any fashion, including but not limited to, the use of tooling similar to that used in wet-out described above, the difference being that within the preforming device it is a resin subtracting process instead of a resin addition process to the rovings. Compressing occurs when rovings are pulled through a cavity that acts as a confined space and compresses the rovings. As the rovings are compressed, internal pressures force the resin out of the roving group(s) and towards the entrance of the cavity. The compression mechanism may be similar to that of squeezing water out of a sponge, by way of example only. The cavity entrance may have a smooth radius on the entry and a smooth internal cavity so as not to damage fibers that slide across its surface. In both cases the removed resin may drip from the tool and into a collection container. The collection container may cycle the resin back into the wet-out device for further use. The collected resin may be cycled via a pump or similar method. Rovings may be pulled through a series of either a single or several wiping tools ranging in quantity from 1-20, although more may be used, such as from 30-40, 40-50, 50-60, and so on. Rovings may be pulled through a series of either a single or several cavities ranging in quantity from 1-20, although more may be used, such as from 30-40, 40-50, 50-60, and so on. These cavities can provide the rovings with a smooth transition as they travel from the wet-out device towards cure of the product, such as the product's final shape and size. The forming cavities may be of various shapes, such as a circle, although unique geometries may also be used. Generally, when multiple cavities are used, the rovings will first pass through the largest cavity opening and subsequent cavities may gradually decrease in size. This can ensure a gradual resin stripping and shape formation. Preforming materials may be metal, polymer, ceramic, or others. Preforming device materials may be of different variations and combinations.

Preforming Device Embodiment—In a preferred embodiment, the current invention may use a two-step preforming process. The first step may perform resin stripping, and the second step may perform roving formation. The first step may utilize multiple round bars fixed in a direction horizontal to the direction of flow of the rovings. The rovings may be wiped and stripped of resin as they pass through the bars. The preferred number of bars may be between 1-30 bars, although more bars may be used, such as from 30-40, 40-50, 50-60, and so on. The wiping bars can strip excess resin from the rovings to bring the rovings closer to the desired fiber to resin ratio. The wiper bars may be setup in a fashion that is, in aspects, universal to strip any number of rovings ranging from 1-200, but may be more, such as from 200-250, 250-300, 300-350, and so on. The act of resin stripping brings the rovings closer to the preferred composition that may range from 50%-90% fiber by weight, by way of example.

After resin stripping, the rovings may enter a second step of roving formation. To accomplish roving formation, the present invention prefers the use of cylindrical bores. In aspects, herein, a cylindrical bore can be a material with a hole or cavity through its body, such as a smooth round hole. In regards to the present invention, the terms bore and cavity may be used interchangeably. In aspects, the rovings may pass through a series of 1-10 bores, each hole or cavity of a bore having a sequentially smaller diameter or size than the previous bore's hole or cavity, by way of example. In other aspects, more than 10 bores can be used in a series. It is preferred that core rovings pass through the bore(s) together, as this can contribute to a more uniform distribution of fibers throughout the rod. The fiber-to-resin ratio may be dependent on the dimensions of the bore(s), or their holes or cavities. An estimated fiber volume fraction may be calculated from the bore's dimensions or the bore's hole or cavity diameter (or size), combined with the cross-sectional area of rovings within the bore's hole or cavity at any given time. Generally, the final bore before entering the winding device most greatly impacts the fiber-to-volume ratio. The volume percentage of fiber may be estimated using the equation $V_F$ (fiber volume percentage)=$F_A$ (area of fiber)/$C_A$ (area of cavity)*100. This can then be converted into weight percentages using the densities of the fiber and resin mixture. In aspects, it is preferable that the components in contact with the rovings are smooth and free of nicks and burs. In the present invention, it is preferred that the final bore be extended into a winding device via a tube of the same inner dimensions as the final preforming cavity. This tube may be referred to as a center guide tube. This tube can serve the purpose of consolidating fibers into a round (or other) shape and allowing the resin to equally or substantially distribute itself throughout the fibers. Another result of the preforming device can be an increase in the pull force required by the pulling device to maintain a constant speed of flow of rovings through the process. This is a result of the friction associated with resin stripping and hydraulic pressures associated with roving and resin compression. The more numerous stripping locations and the larger the break angles, the more pull force required. Similarly, an increased compression of rovings as well as a higher fiber volume fraction both contribute to an increase in the required pull force. In cases, higher pull forces result in higher tensile stresses within the mineral fibers. In aspects, higher pull forces may be achieved by or due to the preforming device. In embodiments, curing the rod while the mineral fibers are stressed in the longitudinal direction contributes to higher mechanical properties of the rod in the longitudinal direction. High tensile stresses in the fibers prior to cure are preferred by the present invention for purposes of creating high mechanical properties in the longitudinal direction of the rod. The present invention prefers the utilization of both resin stripping and roving formation in this device. The tooling in the preforming device may be made of metallic or chemical resistant synthetic materials, mineral based material, any other suitable material, or any combination of materials thereof.

Preforming Device Embodiments—In a preferred embodiment of the present invention, round bars are placed perpendicular to the direction of roving travel, and the rovings pass through the bars in a weaved fashion.

Fiber Winding Device Possible embodiments—As described herein, and in embodiments, the function of a fiber winding device may be to wrap a continuous fiber strand around a core group of rovings as the rovings are pulled in a linear direction. As used herein, a "strand" or "strand of material" can mean, but is not limited to, one or more fibrous material, yarn, thread, cordage, cord, roving, rope, string, cable, wire, or combinations thereof, as would be understood by one of ordinary skill in the art. Consequently, in aspects, the fiber strand or strand of material can be wrapped around the core rovings in a continuous helical pattern that extends along the length of the rovings, by way of example. In aspects, the winding consolidates rovings into a compact singular group. In aspects, the entire composite may be fully cured with the fiber strand intact. In aspects, the fiber strand may be removed before or after cure. In aspects, the winding of the fiber strand may deform the core fibers and create an indentation in the surface of the core rovings. The indentation may be in a spiral or helical pattern along the length of the rovings. An indentation may deform and change the linear direction of a portion of fibers within the core rovings. An indentation may function as an irregularity in the surface of a round rod. The irregularity may serve the purpose of increasing the rod's bond strength to concrete in field applications. In aspects, the fiber strand may lay flat on the surface of the core rovings, not deforming the core rovings in any significant manner and not protruding from the surface of the core rovings in any significant manner. In aspects, the fiber strand may create a rib from (or undulation in) the surface of the core rod. In a preferred embodiment, the fiber strand or strand of material may be cord made from a series or combination of intertwined fibers, strands, strings, or fabric that are joined by twisting, braiding, or otherwise, to form a larger (in cases, more formidable) whole. A cord may be round in shape and maintain the majority of its shape after being wound onto the core rovings. The cord may then create a rib on (or undulation in) the surface of the rod. The fiber strand may be made of mineral fibers, polymer fibers, natural fibers, carbon fibers, any existing fibers, or any combination of different fiber materials.

Winding Device Embodiments—In a preferred embodiment, the fiber winding material comprises of a group of fibers that are twisted or braided together into a round cord. In aspects, this winding fiber cord configuration maintains its round shape when applied to the core rovings. In aspects, if the fiber winding material were not twisted or braided, the fibers may spread out when applied to the core rovings and not maintain a large enough protuberance from the surface of the core rod. The diameter of the fiber winding cord is also a factor. A winding cord too small (with insufficient diameter) may not have the required tensile strength to wrap and consolidate the core rovings or may apply too much pressure distributed over a small or insufficient area in the core rovings, which may create an indentation in the core rovings that is greater than the winding fiber cord's diameter and the cord would no longer create a large enough protuberance from the core rovings. If the fiber winding cord's diameter is too large it may create inefficiencies in the manufacturing process and unnecessary material cost. In embodiments, the helical rib height on the surface of the rod produced by the fiber winding cord is influenced by or a function of the diameter of the fiber winding cord. In aspects, the larger the diameter of the fiber winding cord, the larger the helical rib height. The helical rib height can be the distance from which the outermost surface of rib protrudes from the outermost surface of the core rod. In a preferred embodiment, the rib height can range from 0.05 inch to 0.20 inch, but it can be lower or higher.

The fiber winding cord may be made from materials including but not limited to mineral fibers, synthetic fibers, or carbon fiber. In a preferred embodiment, the cord material is heat resistant, UV resistant, alkaline resistant, and chemical resistant. The fiber winding device may use a motor that may be compressed air, electric, or combustion-powered. The motor, device, or both, may be chain, belt, or gear driven, by way of example. The device may wind fiber material at a rate of 1-600 RPM, but it can wind it faster in aspects. The device may run at a specified revolutions per minute ("RPM") that correlates to a specified pull rate of the puller device. As the pull rate increases, the winding device RPM increases, and vice versa. This RPM-to-pull rate ratio can determine the helical rib's pitch or frequency. The helical rib's pitch may be determined by the relationship of the winding device's RPM and the linear speed of the rod that is controlled by the pulling device. In a preferred embodiment, the rib pitch can range from 0.125 inch to 2.000 inches, but it can be lower or higher. It is preferred that the device may have a consolidating guide tube and rovings may pass through this tube before being wound by the winding cord. It is preferred that the inner diameter of the guide tube be near or exactly the same as the desired diameter of the final fully cured product's core rod. It is preferred that the guide tube have a smooth inside diameter to reduce friction and abrasion to the rovings. It is preferred that the rovings exit the guide tube prior to meeting the winding fiber. Rovings may preferably enter winding within six inches of exiting the guide tube, although it may be more or less than six inches. In aspects, the tube further consolidates rovings and reduces the distance that the rovings are pulled away from the longitudinal axis during winding. In aspects, the device may be fixed with creels that hold the fiber winding cord spools. The spools may be center pulling or outside pulling spools. Outside pulling spools are preferred. The spools may be fixed or may rotate on the creel. It is preferred that the spools rotate on the creel. The creels may be fixed with a tension control device. In aspects, the tension control device gives control of the tension in which the core rovings are to be wound. The tension at which the fiber strand is wound may be controlled by managing the ease or lack of ease at which the spool rotates on the creel, or the fiber strand itself may pass through a tensioning device, or a combination of both. It is preferred to control the tension by managing both the spool and the fiber strand. Multiple fiber strands may simultaneously be wound by the same winding device by using multiple spools of fiber strands. If more than a single fiber strand is used, the device may guide the fiber strands so that they wind the core rovings in a location that is offset from one another to avoid overlapping upon each other. Additional spools may reduce the rotations per minute needed for each device, and reduce the frequency at which empty fiber strand spools need to be replaced with full spools. A single or multiple winding devices may be used. It is preferred to use a single winding device although it should be noted that there are advantages to additional winding devices. For example, additional winding devices enable additional possibilities in rib configurations such as both a clock-wise and counter-clockwise helical rib on the surface of the rod.

Resin Coating Device

A resin coating device may function to coat the entire or partial outer surface of the rod in resin, preferably the entire rod. The purpose of the resin coat may be to provide a protective layer around the entire rod and fiber winding cord. The resin coat provides an extra protective layer to the outer fiber strand and the core rovings to protect against moisture absorption, alkaline environments, and abrasion in field applications. The coating material may be epoxy, vinyl ester, or other materials. It is preferred to use the same resin mixture for the surface coat as that which is used in the core. The coating thickness may be between 0.01-0.125 inch, but may be more, such as from 0.125 inch to 0.15 inch, 0.15 to 0.175 inch, 0.175 inch to 0.2 inch, and so on. In aspects, the device may use a spray coating system, and liquid or powder material may be used. It is preferred to use a partially closed injection device. The partially closed injection device may be a hollow cavity with 1-4 entrances to the cavity, although more entrances are contemplated. The rovings may pass through the center of the cavity, in aspects. The cavity may have a port where the resin is injected. The resin may be injected through a hose and powered by a pump. The pump may be compressed air, electric, or combustion-powered. The resin may drip, drain, or be pumped out of the box into a collection tray. Upon exiting the injection cavity, it is preferred that the rod pass through a series of wipers to wipe excess surface resin and drips. The wipers may be made from but are not limited to flexible polymeric sheet(s) or bristles and may have a round contact surface to match the outer radius of the rod to provide for balanced wiping about the rod. The dripped resin may be cycled back into use. The entrances to the cavity may be fixed with a flexible material to act as a loosely fitting gasket. The gasket may be used to encapsulate the cavity and limit the drain-out of resin from within the cavity. The gasket material may be a polymeric sheet(s) or bristles. The device may use a waterfall method of dripping resin onto the surface of the bar.

Grit Application Device—Grit may be applied to improve the rod's bond strength to concrete. Grit may be applied before or after curing of the core rod, and grit preferably will be applied after core rovings pass through the winding device. When grit is applied prior to curing of the core rod, additional surface resin may not be needed. If grit is applied after curing of the core rod, a resin coating device may need to apply a surface coat of resin to the surface of the rod. In embodiments, the grit application device may include the following. A pile of grit resting on a platform that is intercepting the path of the core rovings. In aspects, the core rovings will have uncured wet resin on the surface, and the grit will adhere to the surface of the core rovings. In aspects, the core rovings will pass through a curing device whilst completely or partially covered in grit, and the curing device will cure the resin and the grit will be locked in place. A pump may be used to continuously replenish the pile of grit as it is consumed. Grit may fall off of the platform and be captured by a tray and cycled back into the process. The grit material may comprise sand-like grains made of mineral or synthetic materials. In a preferred embodiment, the grit comprises sand with a chemical makeup of about 99.8% $SiO_2$, about 0.016% $Fe_2O_3$, about 0.034% $Al_2O_3$, about 0.007% $TiO_2$, about 0.011% CaO, and about 0.007% MgO, wherein the sand grain size may range from but is not limited to 0.004 inch-0.04 inch.

Curing Device

In aspects, a function of the curing device as described herein is to expose the resin mixture to energy that when absorbed by the initiator creates reactive species and kicks off the polymerization reaction and subsequently cross-linking and cure of the resin. The energy may be of different types including but not limited to thermal, infrared, or ultraviolet. A single energy type may be used as a stand-alone mechanism, or a combination of energy types may be used in conjunction. The rod may be fully cured in a single step or parts of the rod may be fully cured in separate steps. For example, the core rod may be fully cured in one step by one type of energy and a surface coat of resin may be fully cured in a following step by the same or a different type of energy. Part of the curing device may utilize irradiators to expose the rod to energy at a distance without being in direct contact with the rod. The irradiators may be fixed in a manner to expose the rod to energy from one direction or may provide 360 degrees full exposure to the entire surface of the rod. In aspects, the irradiators may be able to expose the rod to energy in between one direction and 360 degrees full exposure. The irradiators may utilize reflectors to increase the area of energy exposure to the rod. The device may utilize a single or multiple irradiators ranging from but not limited to 1-20. The rod's exposure time and distance required to achieve full cure may be in the range of but is not limited to 0.01 seconds to 600 seconds of exposure time and 0.01 inch to 720 inches, respectively.

In a preferred embodiment, the device may be used to cure all resin components of the reinforcement rod in one step. It is also contemplated that the core resin and surface coating may be fully cured in separate steps by separate devices. It is preferred that ultraviolet radiation be used to initiate cure. If ultraviolet ("UV") curing is used, in aspects, a high powered UV irradiator is preferred to achieve maximum light penetration within the core of the rod. Different types of UV irradiators may be used, including but not limited to microwave, arc, flash, light-emitting diode, or combinations thereof. In preferred embodiments, a microwave powered irradiator is used due to its high energy output. With microwave irradiators, various electrodeless bulb types may be used to emit desired wavelengths of light. An electrodeless bulb may be a fully sealed and enclosed bulb made from high-grade quartz. Electrodeless bulbs provide a reliable and long-lasting solution to UV radiation. Electrodeless bulbs may utilize but are not limited to mercury vapor with the option for other additives. The vapor is superheated and transformed into UV light emitting plasma by the microwave radiation. Various compositions of vapor materials within the bulbs may determine the wavelengths and intensities emitted. In the known art of electrodeless UV bulbs, it is known that different types of bulbs may be manufactured and used. The type is based on the wavelengths and intensities of the UV light emitted. For example, a type of bulb may emit higher intensities of light in the shorter wavelength region of the UV light spectrum, whereas another type bulb may emit higher intensities of light in the longer wavelengths region of the UV light spectrum, and other type bulbs may fall somewhere in between. The various electrodeless microwave bulb types emit light of all wavelengths across the UV light spectrum, the difference is in the intensities of the light emitted at different wavelengths. For rods having a 0.5 inch diameter or larger, it is preferred to utilize bulbs that emit higher intensities of long wavelength UV light. In aspects, the longer the wavelength the more distance the light will penetrate a material before being absorbed. In aspects, short wavelength UV light is absorbed closer to the surface. In aspects, epoxy acrylate resin cure can be inhibited by the presence of oxygen. In most cases, oxygen will only be or mostly be present on the outer surface of the rod. There are multiple methods to overcome oxygen inhibition as would be understood by one of ordinary skill in the art.

The device may have variable output UV light intensities to allow processing flexibility. Irradiators may be placed in different positions to penetrate the composite from different directions to ensure full cure of all resin, in embodiments. Irradiators may be equipped with two opposing elliptical reflectors to direct the UV light to a focal point.

UV curing, in an embodiment, allows for snap curing of the resin. Snap curing allows the process footprint to be reduced and provides for high line speeds when compared to known fiber reinforced polymer rod manufacturing processes. In aspects, any number of irradiators may be used adjacent to one another and in line, ranging from 1-10 irradiators, although it is contemplated that more could be used.

In aspects, the curing device and/or overall process may pull multiple lines at the same time, such as anywhere from 1-10 lines, although more are contemplated, such as from 10-15, 15-20, 20-25, 25-30, and so on.

Cooling Device

A cooling device may be used to cool, such as rapidly cool, the rod after curing. This may be done to protect any equipment that may come in contact with the product after curing. Rapid cooling allows the footprint of the production line to be decreased by placing components closer to one another. Rapid cooling also protects equipment downstream of the curing device from the heat of the rod that was generated during cure. Multiple cooling methods may be used, including but not limited to, air cooling, water cooling, or combinations thereof.

Pulling Device

A pulling device may be used to pull the product through the process in a linear fashion. The pulling device may be of different types, including but not limited to, Cat, reciprocating, cleated, pinch rollers, or combinations thereof. The pulling device may communicate with one or more of the other components of the process to ensure processing parameters coincide with the pull speed of the device.

In aspects, the process comprises using a winding device to wind the product or other aspects.

Marking Device

A device may be used to label the rods. The device may use inkjet, laser, or other technologies. The device may create markings on the bar such as but not limited to the ASTM specification number, the manufacturer's mark, the size designation, the production lot number, or others.

Product Cutting Device

A product cutting device may cut the product automatically at any chosen length. The product cutting device may be equipped with an encoder to measure a length of the product and to initiate cutting. Various cutting devices may be used, including but not limited to, saw blade, shears, water jet, or combinations thereof. A saw may be a traveling device to allow cutting while the product is moving, which eliminates the need for the production lines to stop during the cutting step. Multiple lines may be cut at the same time. If using a saw blade, dust may be collected by a dust collection device. The dust collecting device may use suction near the cutting location to capture dust after it is created by the saw. An encoding device may be used to automatically cut rods at a chosen length. In a preferred embodiment, an encoding device measures the linear motion of an object as it travels past it. The encoding device can be used to measure the length of the rod and communicate with the cutting device to inform the cutting device when and/or where to initiate the cutting operation.

Collection Device

A collection device may be used to collect, stack, or place the bars in a designated location post-cutting. The collection device may be used to reduce the manual labor needed within the process.

Now turning to the figures, to provide a clearer understanding, the invention will be described in more detail below with reference to the figures.

Figure 1A:
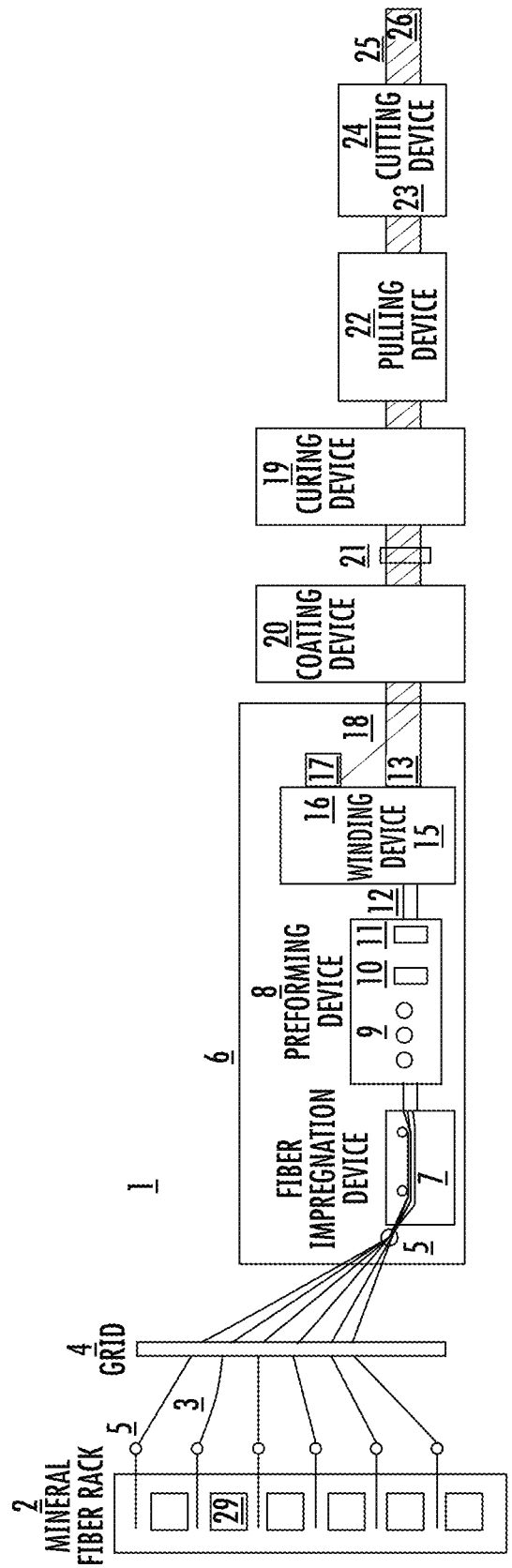
FIGS. 1A-1B are schematics of possible embodiments of the invention described herein, including aspects used for the method described herein.
Figure 1B:
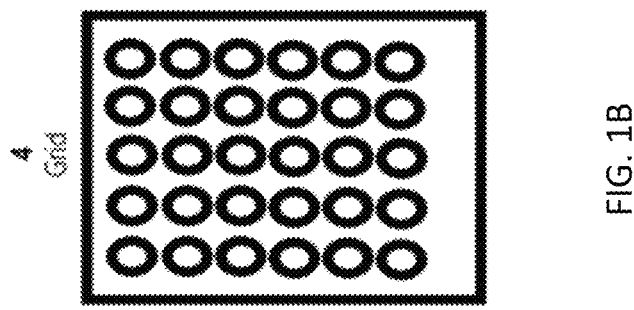

With respect to the figures, the elements within the figures are identified as follows:

1. Plant
2. Fiber Rack
3. Mineral Fiber
4. Grid
5. Tension Bars
6. Enclosure
7. Resin Bath/Fiber Impregnation Device
8. Preforming Device
9. Wiper Bars
10. Bore
11. Final Bore
12. Preforming Tube
13. Core Rod
14. Core Rod Diameter
15. Winding Device
16. Creel
17. Spool
18. Fiber Winding Strand (e.g., yarn)
19. Curing Device
20. Coating Device
21. Wiping Device
22. Pulling Device
23. Encoding Device
24. Cutting Device
25. Reinforcement Rod
26. Strand of Material
27. Pitch
28. Height
29. Mineral Fiber Package
30. Depth
31. Fibers
32. Cut Width
33. Grit
34. Helical Undulation
35. Helical Cut Groove 36. Particle Size
37. Resin FIG. 1A shows an example of the method and devices described herein moving from left to right, wherein in the plant (1), a fiber rack (2) holding mineral fiber (3) and comprising tension bars (5) to give control of the tension in which the core rovings are to be wound before being passed to the grid (4) as explained herein. After passing through the grid (4), the fibers proceed to the fiber impregnation device (7) and then to the preforming device (8) comprising wiper bars (9), a bore(s) (10), and a final bore (11). After exiting the final bore, the impregnated fibers pass through a preforming tube (12) to the winding device (15). The winding device (15) in this example is fixed with creels (16) that hold fiber winding strand spools (17). This results in a core rod (13) with a core rod diameter (14) (not pictured). A strand of material (18), which, in aspects, comprises a group of fibers that are twisted or braided together into a round cord. In aspects, this winding fiber strand configuration maintains its round shape when applied to the core rovings. From here, the core rovings pass to the coating device (20) as described herein, to a wiping device (21), and to the curing device (19) as described herein. A pulling machine (22) in this example pulls the product through the process in a linear fashion. Then a cutting device (24) comprising an encoding device (23) cuts the product to a desired length. A reinforcement rod (25) is created from/produced by/manufactured by/results from the process and in aspects the rod comprises ribs (26). FIG. 1B shows a close up of the grid (4).

Figure 2:
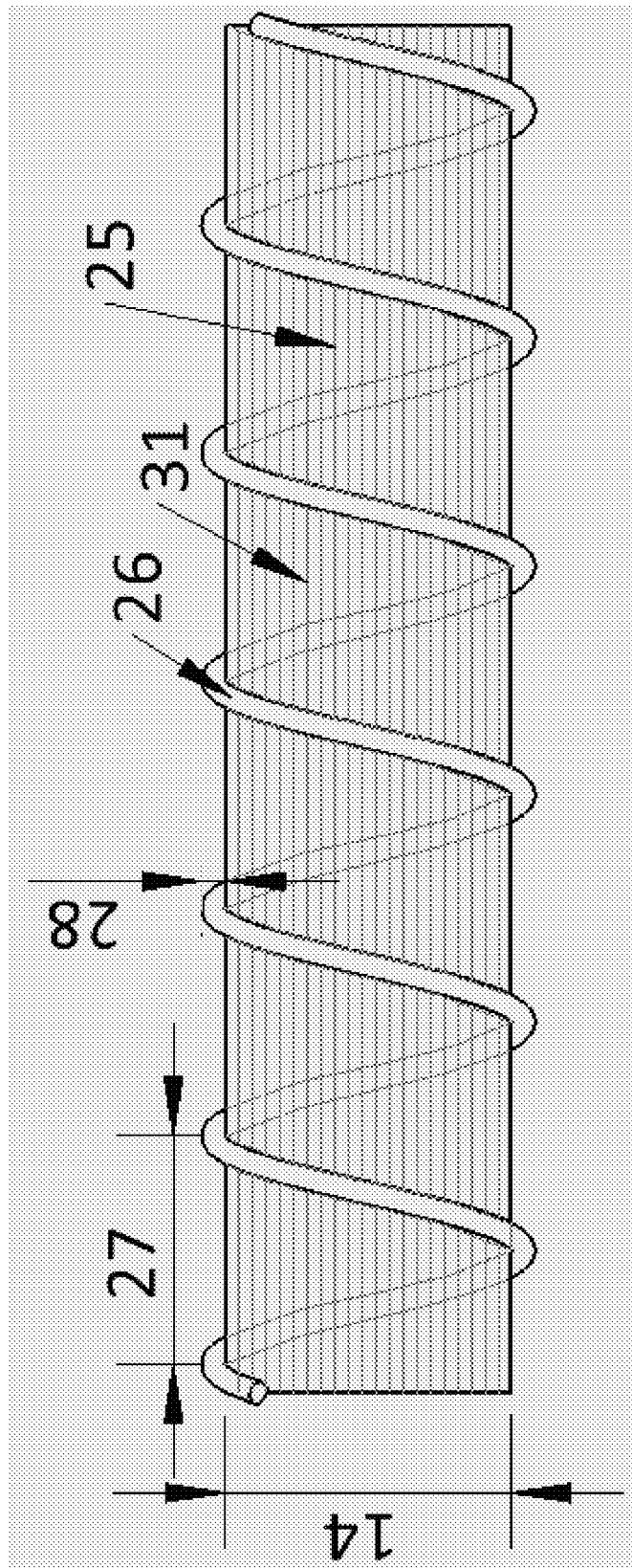
FIG. 2 is a schematic of a possible product resulting from the embodiment of the invention described herein.

FIG. 2 shows an embodiment of a section of a reinforcement rod (25) produced by the method described herein, including a helical rib (26) with a rib pitch (27) and a rib height (28). This method of surface treatment can utilize an "additive method." In aspects, this means that material (e.g., fiber) may be added to the surface of the rod while the reinforcement rod mineral fibers are completely or nearly completely unharmed and undisturbed from their linear orientation. The ribs created by the winding of a fiber material or strand of material around the core rod may be in a helical pattern and may serve to increase the bond strength between the reinforcement rod and the material (e.g., concrete) it is cast in. Also shown is the orientation of fibers (31), such as mineral fibers, in different locations throughout the rod. In a preferred embodiment, the method exemplified in FIG. 2 may not disturb or only minimally disturbs the linear orientation of the fibers throughout the rod and allows the opportunity for all or most of the mineral fibers to contribute towards optimal tensile properties of the reinforcement rod.

Figure 3:
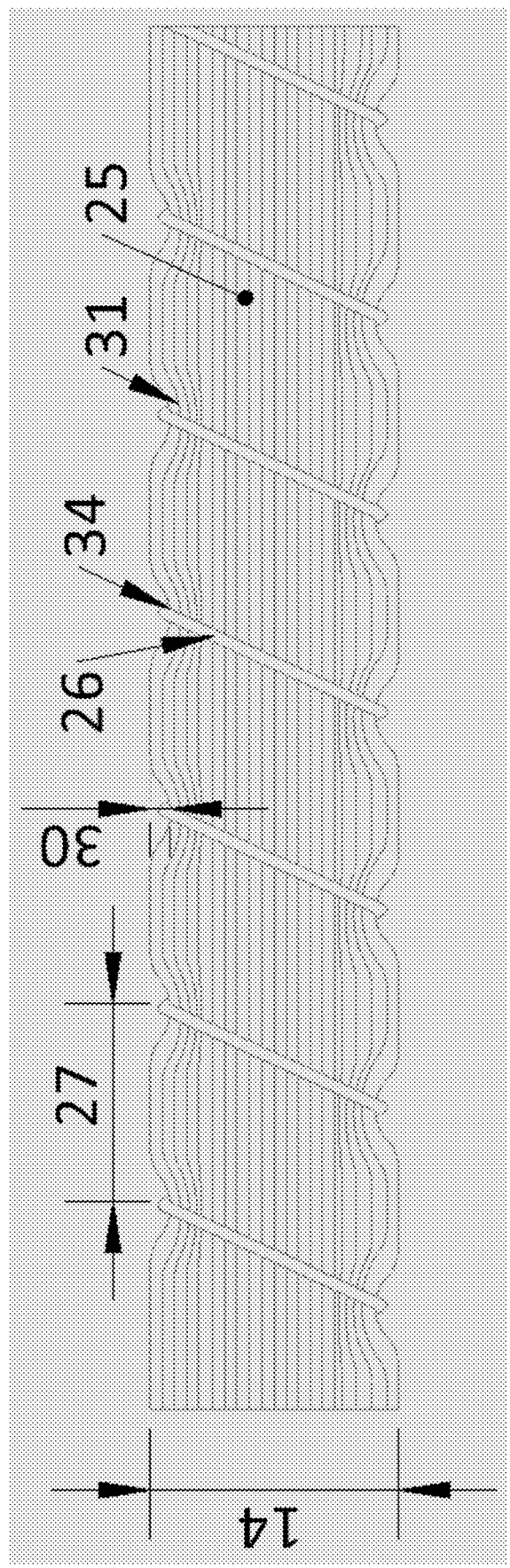
FIG. 3 is a schematic of possible products resulting from the embodiment of the invention described herein.

FIG. 3 shows an embodiment of a section of reinforcement rod (25) produced by an additional variation of the method described herein, including a helical undulation (34) with a pitch (27) and undulation depth (30). This method of surface treatment utilizes a "deformation method." This means, in aspects, that the reinforcement rod mineral fibers may be deformed during the winding process and may form undulations on the surface of the reinforcement rod. The undulations created by the winding of a fiber material (26) around the core rod may be in a helical pattern and may serve to increase the bond strength between the reinforcement rod and the material (e.g., concrete) it is cast in. In cases, the method exemplified in FIG. 3 may disturb the linear orientation of the mineral fibers near the outer circumference of the rod. In cases, the deformation of the fibers may reduce the overall tensile properties of the reinforcement rod.

Figure 4:
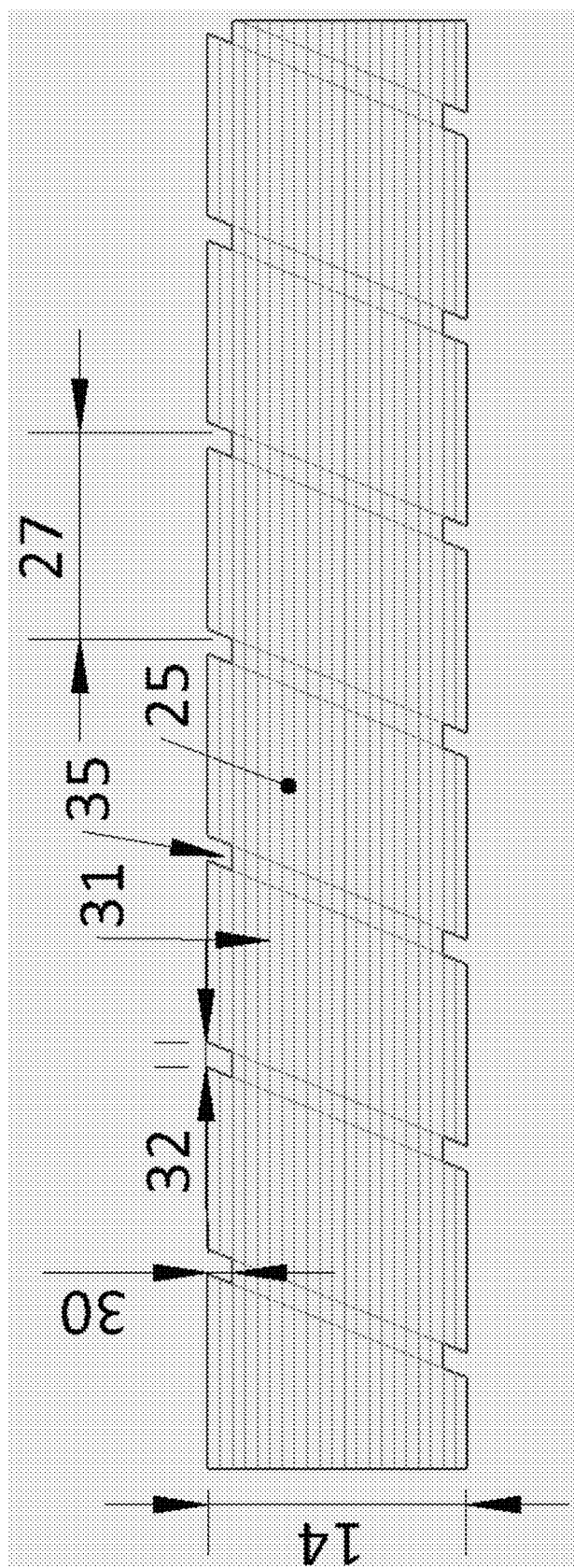
FIG. 4 is a schematic of a possible product resulting from the embodiment of the invention described herein.

FIG. 4 shows an embodiment of a section of reinforcement rod (25) produced by an additional variation of the method described herein, including a helical cut groove (35) with a cut width (32), a cut depth (30), and a pitch (27). This method of surface treatment utilizes a "subtractive method." This means, in aspects, that the reinforcement rod mineral fibers and resin near the outer circumference of the rod may be cut away, leaving a vacancy where material once was and creating a groove. This groove may serve to increase the bond strength between the reinforcement rod and the material (e.g., concrete) it is cast in. The method exemplified in FIG. 4 may cut the previously continuous mineral fibers near the outer circumference of the core rod. In cases, the cut fibers may be eliminated from contributing to the reinforcement rod's tensile properties and may reduce the tensile properties of the reinforcement rod as a whole.

Figure 5:
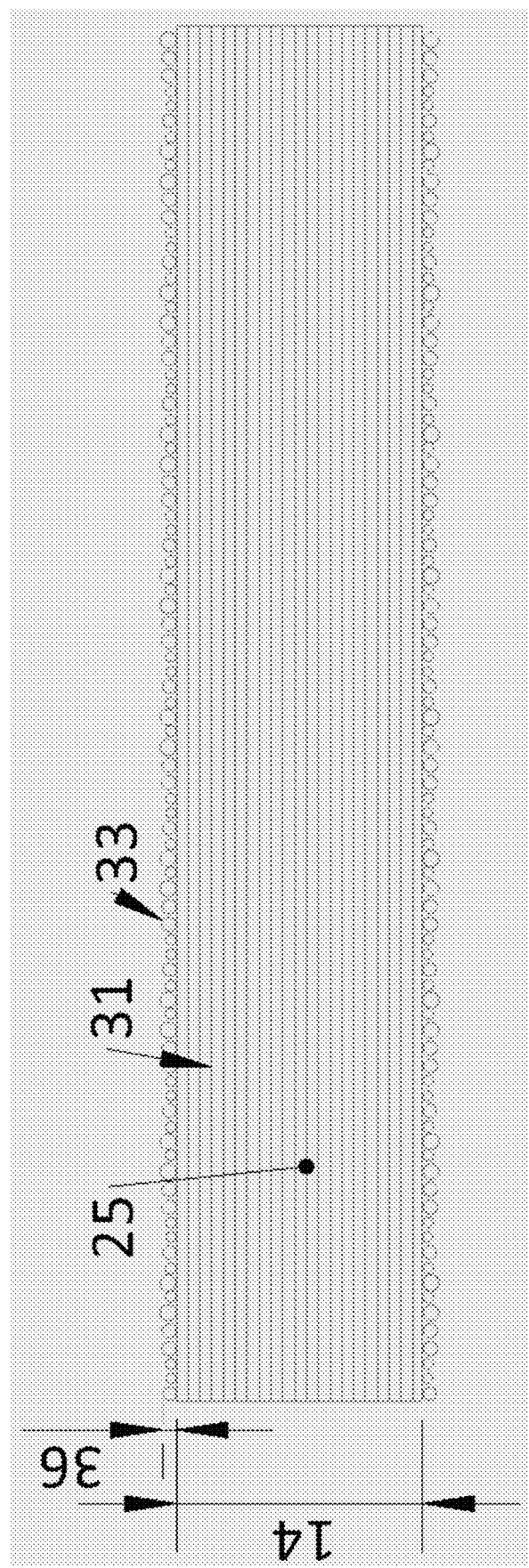
FIG. 5 is a schematic of a possible product resulting from the embodiment of the invention described herein.

FIG. 5 shows an embodiment of a section of reinforcement rod (25) produced by an additional variation of the method described herein, including a cylindrical rod (25) with a grit (33) coating of particle size (36) on the surface of the rod. This method of surface treatment utilizes an "additive method." This means, in aspects, that material (e.g., grit) may be added to the surface of the rod while the reinforcement rod mineral fibers are completely or nearly completely unharmed and undisturbed from their linear orientation. The grit on the surface of the reinforcement rod may serve to increase the bond strength of the reinforcement rod to the material (e.g., concrete) it is cast in. In aspects, the embodiment shown in FIG. 5 may not disturb or only minimally disturbs the linear orientation of the fibers throughout the rod and allows the opportunity for most or all mineral fibers to contribute towards optimal tensile properties of the reinforcement rod.

FIG. 6 shows an embodiment wherein a cross-section of the rod has a substantially uniform distribution of fibers (31) in the resin (37). (Note: fibers are not drawn to scale.)

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

As used herein, the term "about" refers to plus or minus 5 units (e.g., percentage) of the stated value.

Reference in the specification to, e.g., "some embodiments," "an embodiment," "one embodiment," or "other embodiments" means that a particular feature, structure, or characteristic described in connection with the embodiments is included in at least some embodiments, but not necessarily all embodiments, of the inventions.

As used herein, the term "substantial" and "substantially" refers to what is easily recognizable to one of ordinary skill in the art.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

The invention claimed is:

1. A method for making a cured pultruded reinforcement rod from a fibrous composite material using ultraviolet radiation comprising the following steps, wherein the following steps are capable of being performed in a continuously operating process:
   impregnating continuous fibers with a thermosetting resin comprising a photoinitiator or a blend of more than one photoinitiator;
   passing an uncured pultruded reinforcement core rod, the uncured pultruded reinforcement core rod having a diameter of 0.5 inches or larger, through a preforming device, wherein the uncured pultruded reinforcement core rod has a substantially uniform distribution of fibers in the thermosetting resin throughout a cross-section of the uncured pultruded reinforcement core rod after leaving the preforming device;
   winding one or more strand of material around an outer surface of the uncured pultruded reinforcement core rod after it exits the preforming device to provide a textured or ribbed outer surface of the uncured pultruded reinforcement core rod, wherein the one or more strand of material is under tension while being wound around the outer surface of the uncured pultruded reinforcement core rod, and wherein winding the one or more strand of material around the outer surface of the uncured pultruded reinforcement core rod consolidates the impregnated continuous fibers of the uncured pultruded reinforcement core rod without substantially deforming the impregnated continuous fibers of the uncured pultruded reinforcement core rod so that the impregnated continuous fibers maintain a substantially linear orientation throughout a length of the uncured pultruded reinforcement core rod; and
   producing the cured pultruded reinforcement rod in one second or less using a single curing step to fully cure the thermosetting resin using ultraviolet radiation or ultraviolet light;
   wherein the photoinitiator or the blend of more than one photoinitiator forms a reactive species when exposed to the ultraviolet radiation or ultraviolet light.

2. The method of claim 1, wherein the photoinitiator or the blend of more than one photoinitiator are used in conjunction with or mixed with one or more additional radical forming initiators.

3. The method of claim 1, wherein the photoinitiator or the blend of more than one photoinitiator are used in conjunction with or mixed with one or more thermally activated initiators.

4. The method of claim 1, wherein the thermosetting resin comprising the photoinitiator or the blend of more than one photoinitiator releases zero volatile organic compound emissions into the air.

5. The method of claim 1, wherein the cured pultruded reinforcement rod has a tensile modulus greater than 65 gigapascals.

6. The method of claim 1, wherein the cured pultruded reinforcement rod has a tensile modulus greater than 50 gigapascals.

7. The method of claim 1, wherein the cured pultruded reinforcement rod has an ultimate tensile strength greater than 1,200 megapascals.

* * * * *